SANFORD & MALLORY.
Hemp and Flax Brake.
No. 38,340.
2 Sheets—Sheet 1.
Patented April 28, 1863.
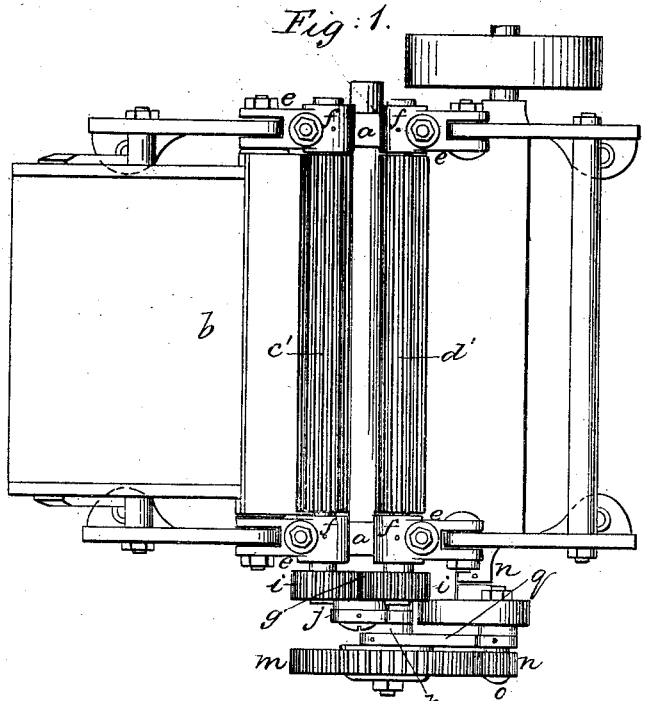
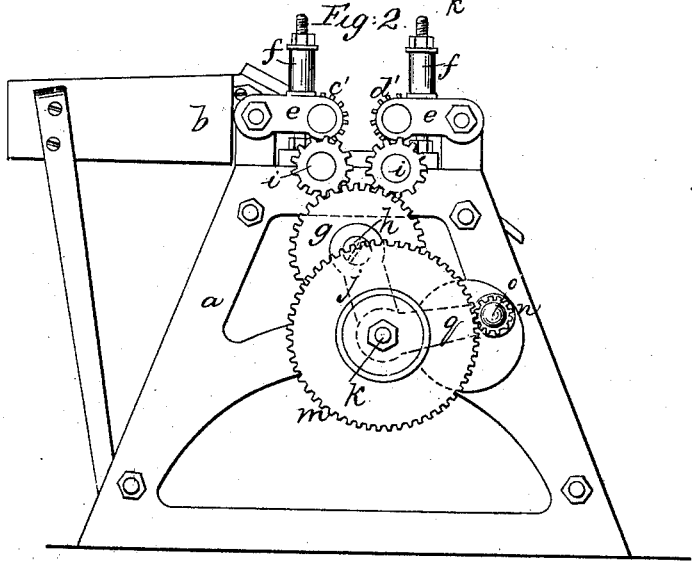
Witnesses.
Inventors.

SANFORD & MALLORY.
Hemp and Flax Brake.
No. 38,340.
2 Sheets—Sheet 2.
Patented April 28, 1863.
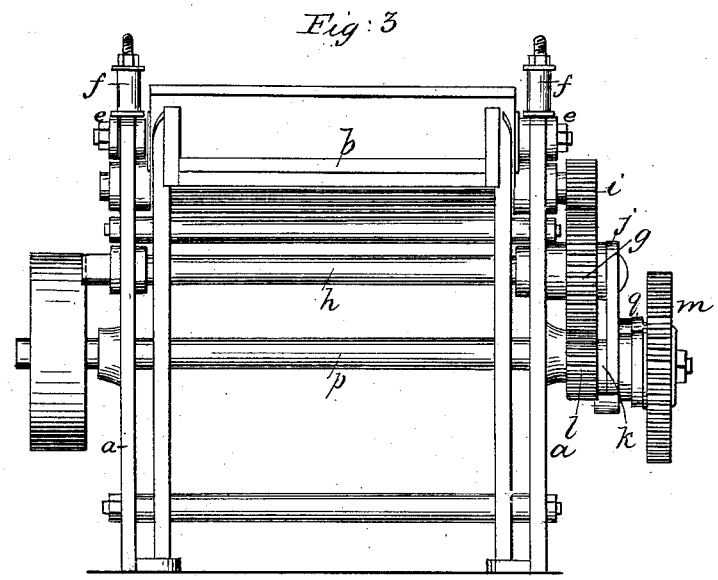
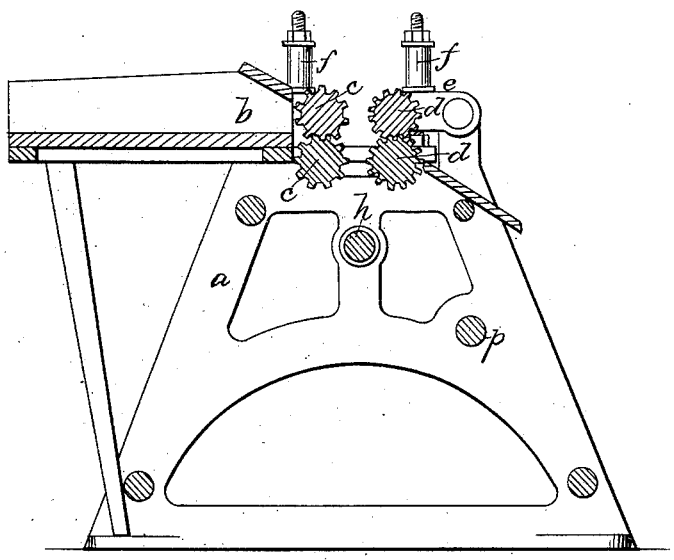

UNITED STATES PATENT OFFICE.

GELSTON SANFORD AND JAMES E. MALLORY, OF NEW YORK, N. Y.

IMPROVEMENT IN MACHINERY FOR BREAKING HEMP AND FLAX.

Specification forming part of Letters Patent No. 38,340, dated April 28, 1863.

*To all whom it may concern:*

Be it known that we, GELSTON SANFORD, a subject of the Queen of Great Britain, temporarily residing in the city of New York, in the State of New York, and JAMES E. MALLORY, of the city, county, and State of New York, have invented a new and useful Improvement in Machinery for Breaking and Cleaning Flax or Hemp or other like Fibrous Substances; and we do hereby declare that the following is a full, clear, and exact description thereof, reference being had to the accompanying drawings, making part of this specification, in which—

Figure 1 is a plan of the machine; Fig. 2, a side elevation; Fig. 3, a front elevation; and Fig. 4, a vertical cross-section.

The same letters indicate like parts in all the figures.

It has been ascertained that the most efficient method of breaking and cleaning flax, hemp, and other like plants to separate the woody and other foreign substances from the fibers is by means of fluted rollers having a reciprocating rotary motion to act upon the fibrous substances alternately in opposite directions, the motion forward from the feeding-in or front side having a greater range than in the reversed direction, to draw in the fibrous substance and cause it to travel through between the rollers; but, as it is important, with reference to economy, that these motions should be worked at a high velocity, it has been found in practice that the mechanisms heretofore employed to impart the required motions to the rollers were not adapted to the purpose, so that if operated at a velocity approximate to the demands of economy they would soon destroy themselves by the violence of the concussions.

The object of our said invention is to impart to the rollers the required reciprocating motions, above indicated, at high velocities, and by a mode of operation which will admit of high velocities without serious injury to the mechanism; and to this end our said invention consists in imparting to the rollers a reciprocating rotary motion for the breaking action, by means of a crank vibrating an arm in combination with an additional rotary motion, not reciprocating, imparted by means of a pinion or its equivalent on the crank-pin, so that the said additional rotary motion shall cause the rollers to have a greater range in one direction than in the opposite.

In the accompanying drawings, $a$ represents a suitable frame, and $b$ a feeding-table, on which the flax, hemp, or other material to be treated is placed to be presented to the breaking action of the fluted rollers. There are two pairs of fluted rollers, $c$ $c'$ and $d$ $d'$, the bottom rollers, $c\ d$, having their journals mounted in fixed boxes, and the top rollers, $c'$ $d'$, in movable boxes $e\ e\ e\ e$, held down by springs $f\ f\ f\ f$, to cause the upper rollers to make pressure on the bottom rollers. It is preferable to have the flutes of the first pair of rollers $c\ c'$, larger than the second pair $d\ d'$. The bottom rollers, $c\ d$, receive motion from a cog-wheel, $g$, which engages pinions $i\ i$ on the shafts of the rollers. This cog-wheel $g$ may be mounted, so as to turn either on a shaft, $h$, or on a stud projecting from the side of the frame, and on the same shaft or stud is also mounted an arm, $j$, capable of turning thereon independently of the cog-wheel $g$. The lower end of this arm $j$ is formed with a suitable box, in which is mounted a short shaft, $k$, that carries on its inner end a pinion, $l$, the cogs of which engage and communicate motion to the cog-wheel $g$, and on its outer end it carries a cog-wheel, $m$, which receives motion from a pinion, $n$, on, and secured to, the outer end of a crank-pin, $o$, on the driving-shaft $p$. The crank-pin $o$ is linked to the shaft $k$ of the cog-wheel $m$ by a connecting-link, $q$, whereby the pinion $n$ and cog-wheel $m$ are held in gear during the rotation of the crank, that the pinion $n$ may impart a continuous rotary motion to the cog-wheel $m$, while the rotation of the crank, by the connecting-link $q$, imparts a vibratory motion to the arm $j$, which carries the short shaft $k$, with its cog-wheel $m$ and pinion $l$.

From the foregoing it will be seen that the cog-wheel $g$, from which the fluted rollers receive motion, receives a vibrating or reciprocating motion on its axis from the crank-pin $o$ by means of the connecting-link $q$, which causes the arm $j$ to vibrate, the said arm being held or tied to the periphery of the wheel $g$ by the pinion $l$, which pinion can only turn with the cog-wheel $m$ on its shaft, which wheel $m$ is controlled in its rotation by the pinion $n$ on the crank-pin. This reciprocating rotary motion of the wheel $g$ thus imparted communicates to the two bottom rollers a corresponding reciprocating rotary motion of equal range in both directions; but as the pinion $n$, which drives the cog-wheel $m$, is fixed on the crank-pin $o$, a rotary motion is thereby imparted to the wheel $m$, and by it, through the pinion $l$, cog-wheel $g$, and pinions $i\ i$ to the fluted rollers; and as this rotary motion, thus imparted by the pinion on the crank-pin, is all in one direction, and comes nearly to a state of rest when the crank-pin reaches its dead-point on the side opposite to the axis of the wheel, it follows that the reciprocating motion of the rollers is greater in the direction from the feeding-table $b$ than in the reverse direction.

By the mode of operation above described the required reciprocating motion is given to the rollers to break the flax, hemp, or other fibrous substance by a back and forward action so essential to the proper separation of the woody or other foreign matter from the fibers, while at the same time a feeding action is imparted to draw in the fibers and cause them to travel through between the rollers, and be delivered after the breaking action has been completed; and it will also be seen that, what is essential in an economical point of view, these motions are imparted so as to avoid violent jars or concussions when operated at a high velocity.

It will be obvious that instead of cog-wheels and pinions, belts or chain-wheels and pulleys may be used, although cog-wheels and pinions are preferred; and it will also be obvious that the number of pairs of rollers to be operated by this mechanism may be varied, and that, instead of causing the cog-wheel $g$ to engage pinions on the feed-rollers, such a wheel may be directly on the shaft of one of a pair of rollers, and this, if desired, may communicate the desired motion to other pairs of rollers.

What we claim as our invention, and desire to secure by Letters Patent, is—

In mechanism for operating rollers for breaking or cleaning flax, hemp, or other like fibrous substances, imparting to such rollers a reciprocating rotary motion by means of a crank connected with an arm vibrated thereby, substantially as described, in combination with an additional rotary motion operating in one direction only, and imparted by a pinion or the equivalent thereof on the crank-pin, and communicated by cog-gearing to the rollers, the axis of the intermediate gearing being connected with the vibrating arm, which transmits the reciprocating motion to the rollers, substantially as and for the purpose specified.

GELSTON SANFORD.
JAS. E. MALLORY.

Witnesses:
WM. H. BISHOP,
A. DE LACY.